United States Patent
Tran

(12) United States Patent (10) Patent No.: US 6,588,070 B2
Tran (45) Date of Patent: Jul. 8, 2003

(54) PIPE LEAK REPAIR CLAMP

(76) Inventor: Hai Tran, 5828 Naylor Ave., Livermore, CA (US) 94550

( * ) Notice: Subject to any disclaimer, the term of this patent is extended or adjusted under 35 U.S.C. 154(b) by 0 days.

(21) Appl. No.: 09/986,308

(22) Filed: Nov. 8, 2001

(65) Prior Publication Data

US 2003/0084551 A1 May 8, 2003

(51) Int. Cl.[7] .............................................. F16L 33/04
(52) U.S. Cl. ............................................................ 24/279
(58) Field of Search .......................... 24/279–282, 284, 24/20 LS; 138/99; 285/280–282, 284, 373, 420, 419, 15

(56) References Cited

U.S. PATENT DOCUMENTS

| | | | | |
|---|---|---|---|---|
| 492,165 A | * | 2/1893 | Nase | 24/279 |
| 1,907,889 A | * | 5/1933 | Stauffer | 24/483 |
| 3,088,185 A | * | 5/1963 | Smith | 24/279 |
| 3,189,969 A | * | 6/1965 | Sweet | 24/279 |
| 3,680,180 A | | 8/1972 | Gould et al. | |
| 3,700,008 A | | 10/1972 | Hackman | |
| 3,737,959 A | * | 6/1973 | Smith et al. | 24/279 |
| 3,889,324 A | | 6/1975 | Glover | |
| 4,409,708 A | * | 10/1983 | Hauffe | 24/279 |
| 4,413,388 A | | 11/1983 | Akhtar-Khavari et al. | |
| 4,606,377 A | * | 8/1986 | Montgomery | 138/99 |
| 5,079,805 A | * | 1/1992 | Mlachnik | 24/20 LS |

FOREIGN PATENT DOCUMENTS

| | | | | |
|---|---|---|---|---|
| EP | 392936 A | * | 10/1990 | F16L/11/12 |
| GB | 2229245 A | * | 9/1990 | F16L/55/16 |

* cited by examiner

*Primary Examiner*—James R. Brittain
(74) *Attorney, Agent, or Firm*—Richard C. Litman

(57) ABSTRACT

A low profile pipe leak repair clamp for sealing a leak in a wide range of pipe sizes includes a flexible, circular metal band lined with a sealing gasket. The clamp a tightening assembly comprising a pair of open and close lugs and a nut and bolt for tightening the band around a leaking pipe. Each lug includes an open slot leading to an inner recess adapted to firmly engage a folded end of the flexible metal band, the recess being of such dimensions as to maintain each folded end in its original shape, thus preventing the metal band from being pulled from the slot upon tightening the clamp. Each lug has an upper jaw and a lower pressure jaw forming the slot and recess. The lower pressure jaw is arcuate at its end and its lower surface chamfered downward to the lower lug surface.

12 Claims, 10 Drawing Sheets

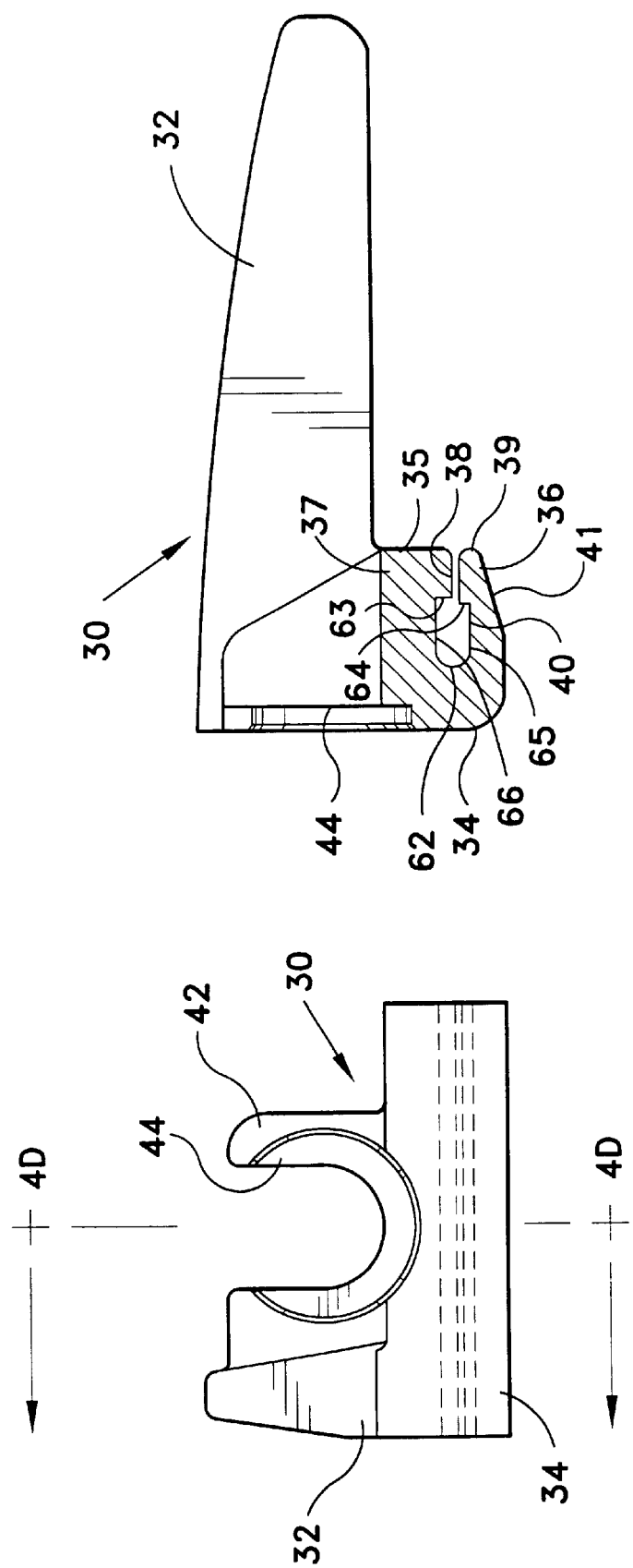

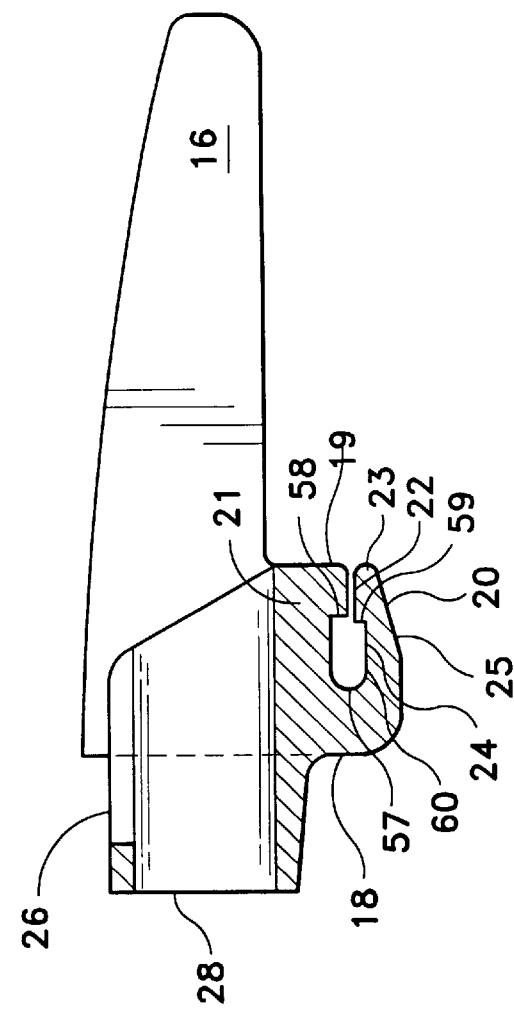
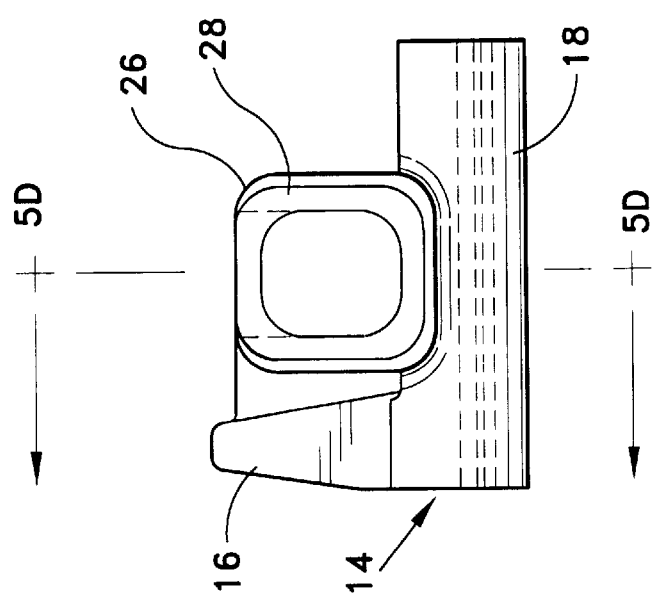
FIG. 5D
FIG. 5C

PIPE LEAK REPAIR CLAMP

BACKGROUND OF THE INVENTION

1. Field of the Invention

The present invention relates generally to clamps. More particularly, the present invention relates to a pipe leak repair clamp assembly.

2. Description of the Related Art

Pipe clamps employing interlocking lugs and a tightening nut and bolt and useful for tightening a flexible steel band around a gasket to stop a leak in the pipe are well known devices. Known devices have a relatively high profile and are subject to pulling apart upon tightening the clamp when one end of the steel band pulls away from one of the lugs. It would be desirable to have a lug-type pipe clamp which has a relatively low profile to avoid interference with other pipes or structures in the immediate vicinity. It would also be desirable to provide a clamp design which will not pull apart upon tightening and will accomodate a wide range of pipe sizes.

U.S. Pat. No. 3,680,180, issued Aug. 1, 1972, to Gould et al., describes a low-profile wide-range pipe clamp adapted for encircling a pipe as a leak repair. The clamp assembly includes a flexible metal band having a gasket liner for sealing the defective section of pipe. The tightening pressure on the pipe is provided by screwing a bolt, which brings the side lugs together, resulting in the metal band tightening around the pipe. A gap bridge is provided to prevent the gasket from extruding between the spaced ends of the metal band. Each lug has a slot and a bore in which an end of the metal band is held using a rod.

U.S. Pat. No. 3,700,008, issued Oct. 24, 1972, to Hackman, describes a pipe clamp with an improved gap bridge. The clamp comprises a pipe encircling band with opposing folded ends, a sealing elastomeric gasket liner, tightening lugs, and a gap bridge member.

U.S. Pat. No. 4,413,388, issued Nov. 8, 1983, to Akhtar-Khavari et al. describes a pipe repair clamp having opposed lugs with retaining slots disposed in the base portions of the lugs to hold the folded ends of the flexible band. A steel bridge plate is interposed between the gasket and the band bridging the open space between the bases of the lugs. This prevents deformation of the gasket into the open space and ensures a uniform sealing pressure on the gasket.

U.S. Pat. No. 3,889,324, issued Jun. 17, 1975, to Glover, describes a pipe repair clamp having clamp lugs defining a longitudinal, non-circular cavity in which to receive the band ends looped in a generally similar cross section thereof. A noncircular staking bar is longitudinally positioned within each band loop in force fit engagement in opposition to increasing draw forces tending to urge separation between the band and jaw, the bar operably acting as a rotational interlock to increase gripping tension therebetween.

None of the above inventions and patents, taken either singularly or in combination, is seen to describe the instant invention as claimed. Thus a pipe leak repair clamp solving the aforementioned problems is desired.

SUMMARY OF THE INVENTION

The present invention is a leak repair clamp for sealing a leak in a pipe. The repair clamp includes a flexible, circular metal band lined with a gasket for sealing a leak. The clamp further includes a tightening assembly comprising a pair of open and close lugs and a nut and bolt for tightening the band around a leaking pipe. Each lug includes an open slot leading to an inner recess adapted to firmly engage a folded end of the flexible metal band. The slot is about equal to the thickness of the band and the recess is configured to hold a multiple folded end of the flexible metal band by providing lower and upper walls expanding radially from the grooves which engage the folded end, the recess being of such dimensions as to maintain folded each end in its original shape, thus preventing the metal band from being pulled from the slot upon tightening the clamp.

The open slots divide the lugs into upper and lower or pressure jaws. The lugs have chamfers extending along their respective pressure jaws tapering upward toward the respective pressure jaw open ends. When the open and close lugs are assembled with the nut and bolt, the slot in each lug open toward each other and are coplanar. The lugs are installed with sufficient clearance between the lugs that the chamfer of each lug pressure jaw is substantially perpendicular to a radius of the pipe near the pressure jaw end. This allows for the bolt to extend close to the pipe and thus lowers the profile of the clamp. Also, the chamfered pressure jaw reduces the downward tension on the metal band when tightening, thus reducing the tendency for the end of the band to pull out of the groove upon tightening the clamp. The configuration of the pressure jaw also allows the use of the clamp to repair a large range of pipe sizes. A relatively large bridge plate is provided to allow use of the inventive clamp for such a large range of pipe sizes.

Accordingly, it is a principal object of the invention to provide a pipe clamp for sealing leaks having a low profile.

It is another object of the invention to provide a pipe clamp as above having slotted lugs which have chamfered lower pressure jaws exerting a lower downward tension on metal strips held therein.

It is a further object of the invention to provide a pipe clamp as above, said slots opening into recesses adapted to maintain the folded ends of the metal strips tightly secured therein.

Still another object of the invention is to provide a pipe clamp as above having a configuration for folding the ends of the metal strips so as to remain firmly held within said lugs.

Yet another object of the invention is to provide a pipe clamp as above which fits a large range of pipe diameters.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4C is an end view of the open lug of FIG. 3.

FIG. 4D is a sectional view along the line 4D—4D of FIG. 4C.

FIG. 5C is an end view of the close lug of FIG. 3.

FIG. 5D is a sectional view along the line 5D—5D of FIG. 5C.

Similar reference characters denote corresponding features consistently throughout the attached drawings.

DETAILED DESCRIPTION OF THE PREFERRED EMBODIMENTS

The present invention is a leak repair clamp for sealing a leak in a pipe. The repair clamp includes a flexible, circular metal band lined with a gasket for sealing a leak. The clamp further includes a tightening assembly comprising a pair of open and close lugs and a nut and bolt for tightening the band around a leaking pipe. Each lug includes an open slot leading to an inner recess adapted to firmly engage a folded end of the flexible metal band. The slot is about equal to the thickness of the band and the recess is configured to hold a multiple folded end of the flexible metal band by providing lower and upper walls expanding radially from the grooves which engage the folded end, the recess being of such dimensions as to maintain each folded end in its original shape, thus preventing the metal band from being pulled from the slot upon tightening the clamp.

The open slots divide the lugs into an upper jaw and a lower pressure jaw. The lugs have chamfers extending along their respective pressure jaws tapering upward toward the respective pressure jaw rounded open ends. When the open and close lugs are assembled with the nut and bolt, the slot in each lug open toward each other and are coplanar. The lugs are installed with sufficient clearance between the lugs that the chamfer of each lug pressure jaw is substantially perpendicular to a radius of the pipe near the pressure jaw arcuate end. This allows for the bolt to extend close to the pipe and thus lowers the profile of the clamp. Also, the chamfered pressure jaw reduces the downward tension on the metal band when tightening, thus reducing the tendency for the end of the band to pull out of the groove upon tightening the clamp.

Figure 1:
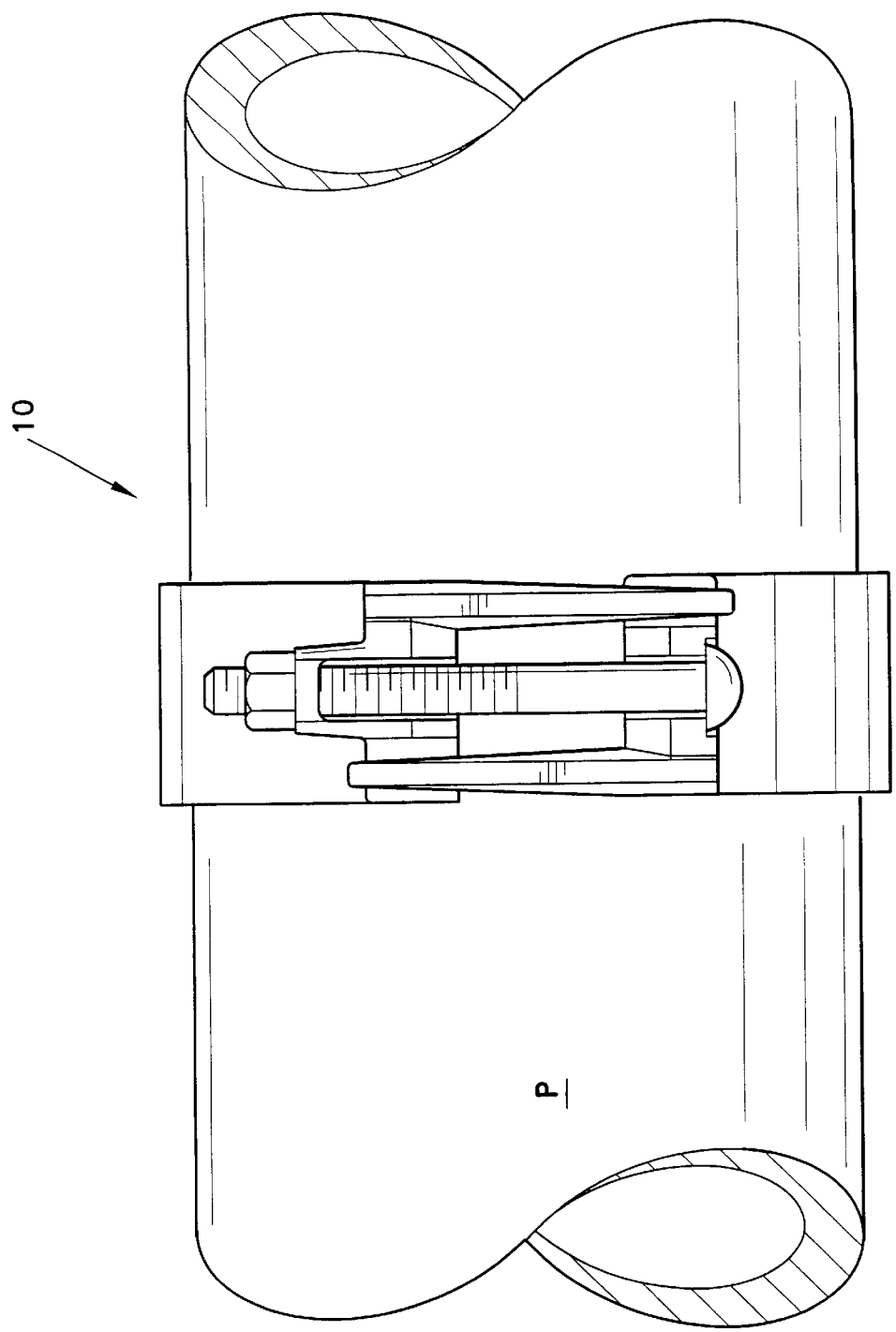
FIG. 1 is an environmental, plan view of a pipe leak repair clamp according to the present invention.

Referring to FIG. 1 there is shown an environmental plan view of the pipe P as repaired by pipe leak repair clamp assembly 10.

Figure 2:
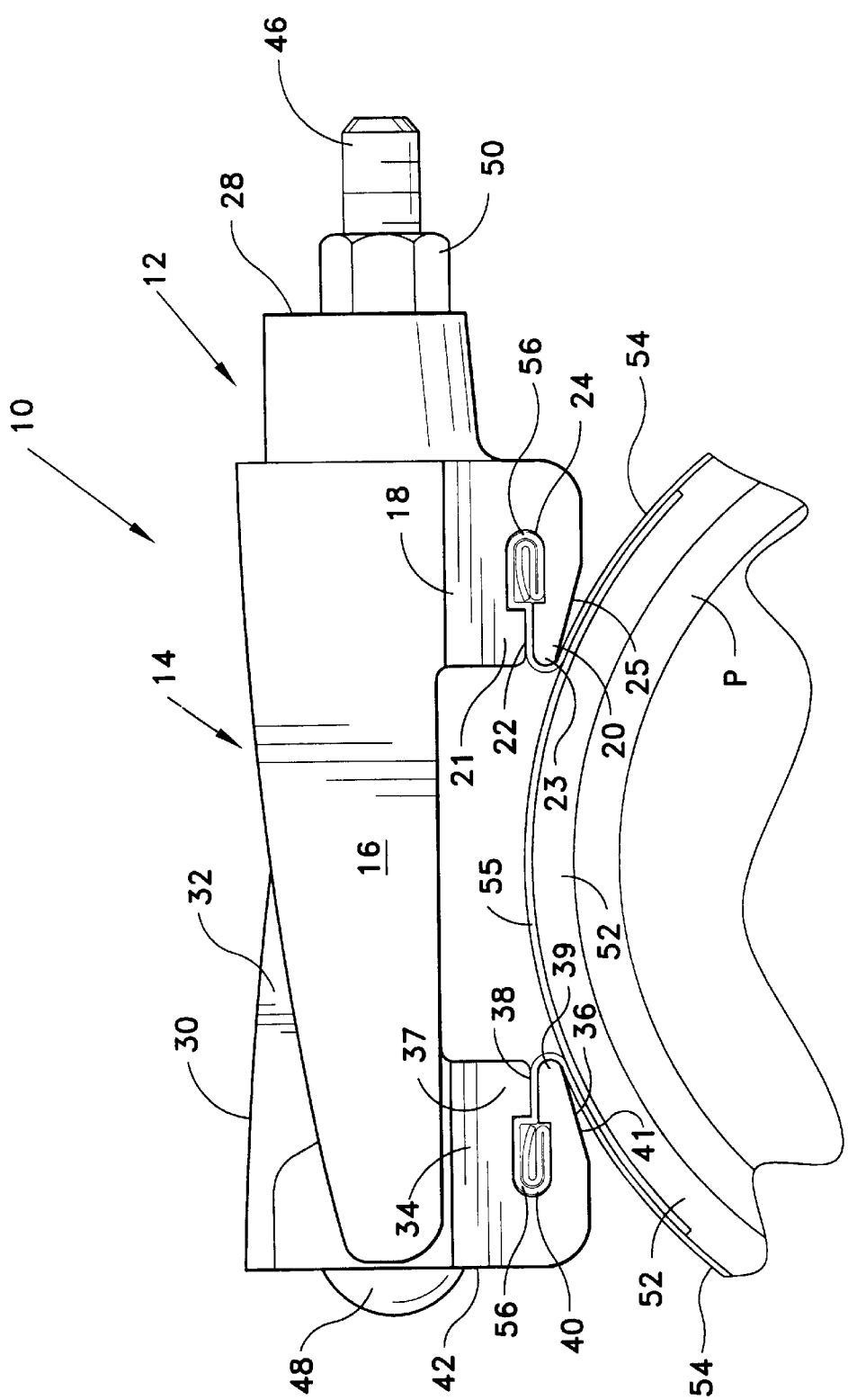
FIG. 2 is a side elevational view FIG. 1.
Figure 3:
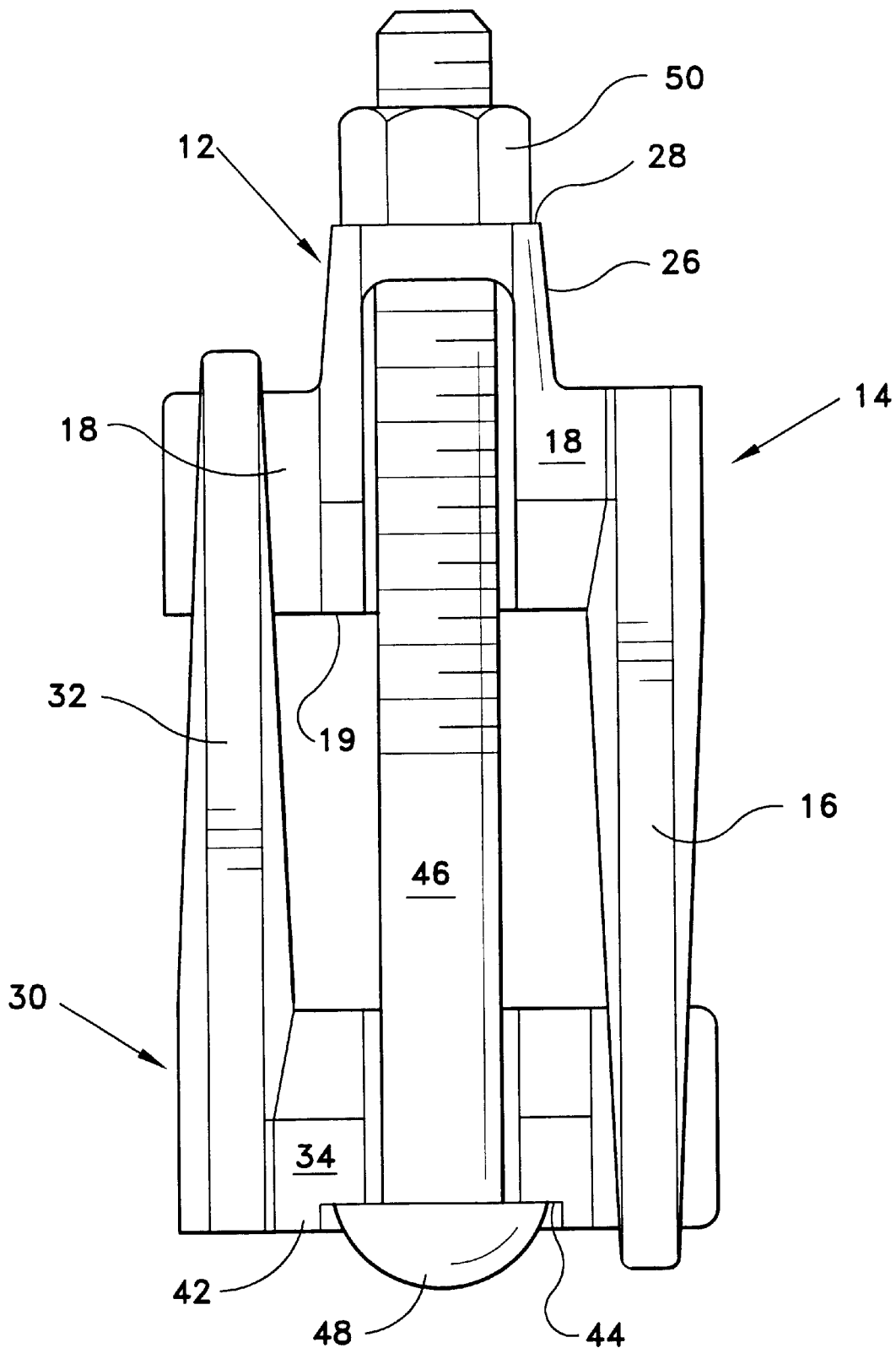
FIG. 3 is a plan view of the lug assembly of FIG. 1.

Referring to FIGS. 2 and 3 there are shown a side elevational view of FIG. 1, and a plan view of the lug assembly of FIG. 1, respectively, wherein pipe leak repair clamp assembly 10 includes repair clamp 12 having close lug 14 comprising close lug tensioner bar 16 extending horizontally from close lug body 18. Close lug body 18 extends axially along pipe P and comprises close lug body jaw portion 19 having close lug pressure jaw 20 and close lug upper jaw 21 defining and separated by close lug groove 22, the outer end of which is defined by close lug pressure jaw rounded open end 23. Close lug groove 22 opens at its opposite end into inner recess 24. Close lug pressure jaw chamfer 25 extends under pressure jaw 20 of body 18, ending at open end 23. A bolt receiving boss 26 having a nut bearing surface 28 is located upon body 18 spaced from and parallel to tensioner bar 16.

Repair clamp 12 also includes open lug 30 opposite close lug 14 and having open lug tensioner bar 32 extending horizontally from close lug 14 and parallel to close lug tensioner bar 16. Open lug body 34 extends axially along pipe P parallel and spaced from close lug body 18 and comprises open lug body jaw portion 35 having open lug pressure jaw 36 and open lug upper jaw 37 defining and separated by open lug groove 38, the outer end of which is defined by open lug pressure jaw rounded open end 39. Open lug groove 38 opens at its opposite end into inner recess 40. Open lug pressure jaw chamfer 41 extends from open end 39 of pressure jaw 36 to the lower surface of body 34. A bolt receiving boss 42 having a bolt head seat 44 is located upon body 18 spaced from and parallel to tensioner bar 16.

Figure 4A:
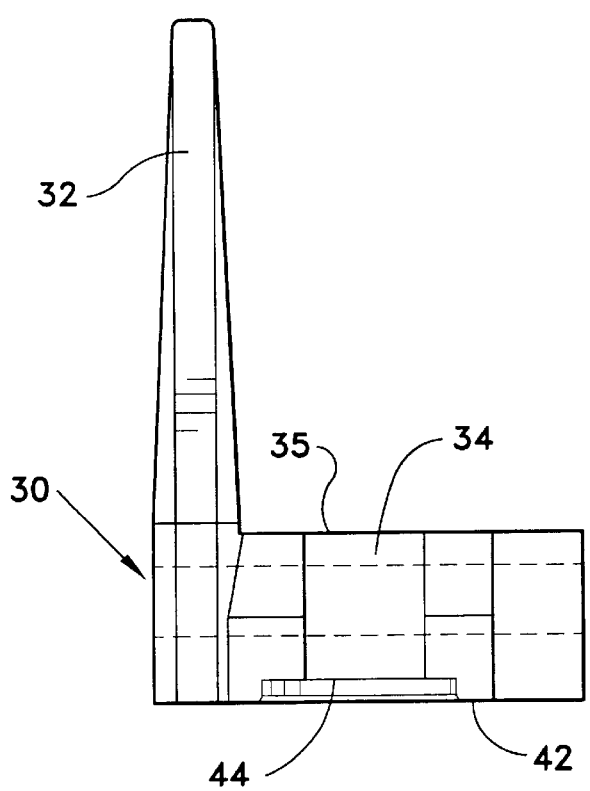
FIG. 4A is a plan view of the open lug of FIG. 3.
Figure 4B:
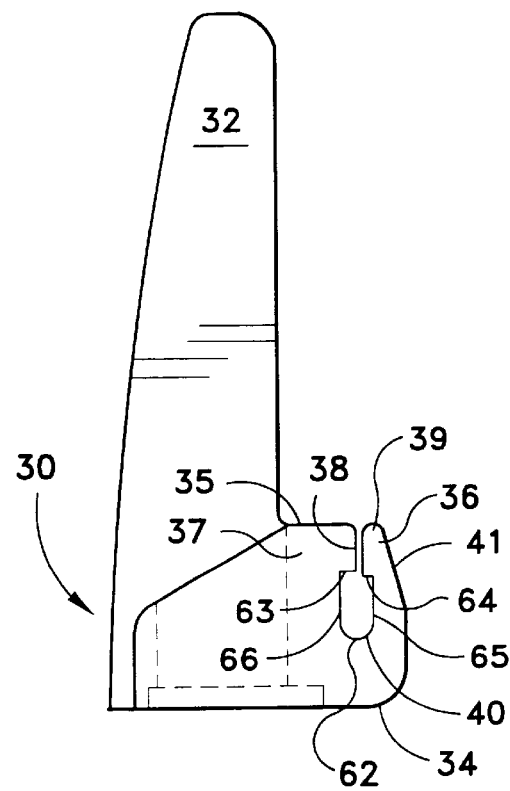
FIG. 4B is a side view of the open lug of FIG. 3.
Figure 5A:
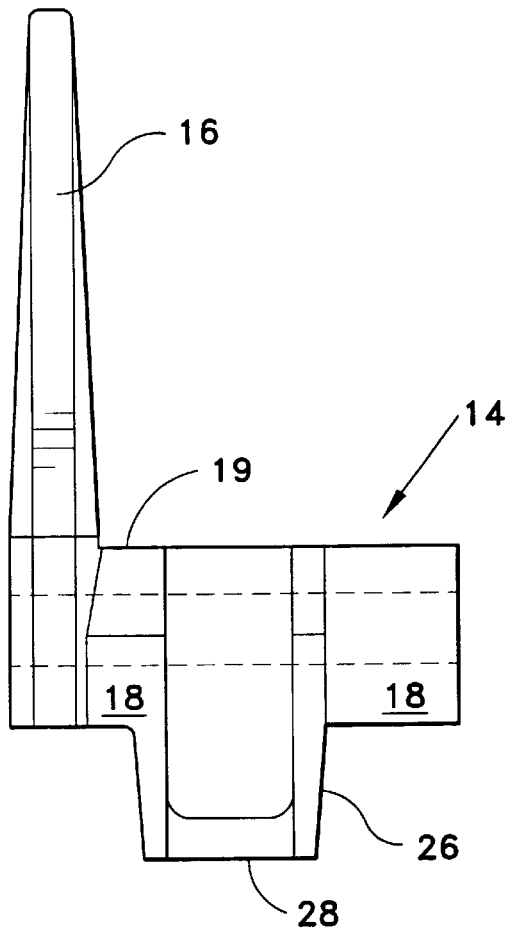
FIG. 5A is a plan view of the close lug of FIG. 3.
Figure 5B:
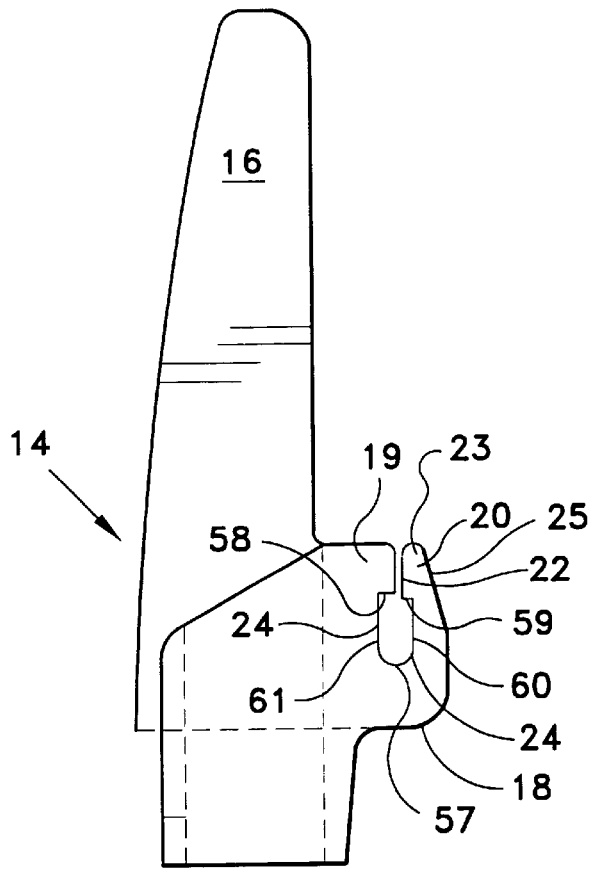
FIG. 5B is a side view of the close lug of FIG. 3.

Referring to FIGS. 4A–4D there is shown a plan view, a side view, and an end view of the open lug of FIG. 3, and a sectional view of FIG. 4C, respectively. Open lug 30 comprises tensioner bar 32 and body 34. Open lug body 34 comprises jaw portion 35 having pressure jaw 36 and upper jaw 37 defining groove 38, said groove leading from pressure jaw arcuate open end 39 and opening into recess 40. Open lug recess 40 is defined by concave recess inner wall 62, opposing outer upper wall 63 and outer lower wall 64, lower wall 65, and opposing upper wall 66. Outer lower wall 64 is spaced inward from outer upper wall 63 by about the thickness of band 54.

Close lug 14 comprises tensioner bar 16 and body 18. Open lug body 18 comprises jaw portion 19 having pressure jaw 20 and upper jaw 21 defining groove 22, said groove leading from pressure jaw arcuate open end 23 and opening into recess 24. Close lug recess 42 is defined by concave recess inner wall 57, opposing outer upper wall 58 and outer lower wall 59, lower wall 60, and opposing upper wall 61. Outer lower wall 59 is spaced inward from outer upper wall 58 by about the thickness of band 54.

Figure 6:
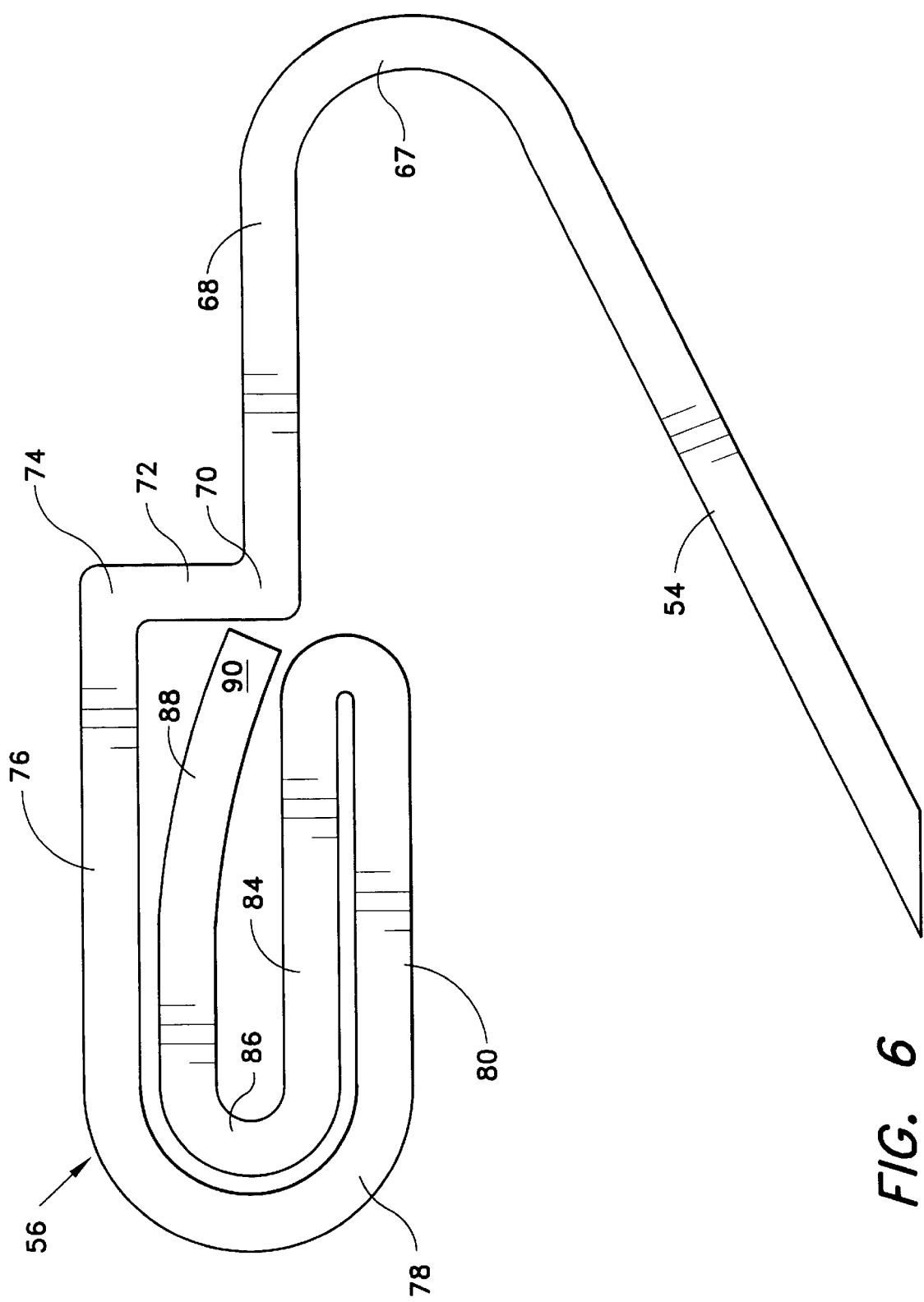
FIG. 6 is a detail view of the metal band folded end of FIG. 2.

Referring to FIG. 6, there is shown a detail view of the band end folds of FIG. 2 wherein band 54 has an inwardly coiled end fold 56. Band 54 has an radius bend 67 leading to a horizontal portion 68 leading to end fold 56. End fold 56 has in succession a right angle upward bend 70, a vertical end portion 72, a right angle horizontal bend 74, an upper outer horizontal portion 76, a 180 degree radius bend 78, a lower outer horizontal portion 80, a 180 degree sharp radius bend 82 an inner lower horizontal portion 84, a 180 degree intermediate radius bend 86, an inner downward arc portion 88, and band end portion 90. It may be appreciated that a tension force outward along horizontal portion 68 induces band end portion 90 to be urged forward and downward between right angle upward bend 70 and 180 degree sharp radius bend 82, thus locking the band end folds 56 in close lug recess 24 and open lug recess 40 (see FIG. 2). The band end folds 56 substantially conform with the dimensions of recesses 24 and 40.

Figure 7:
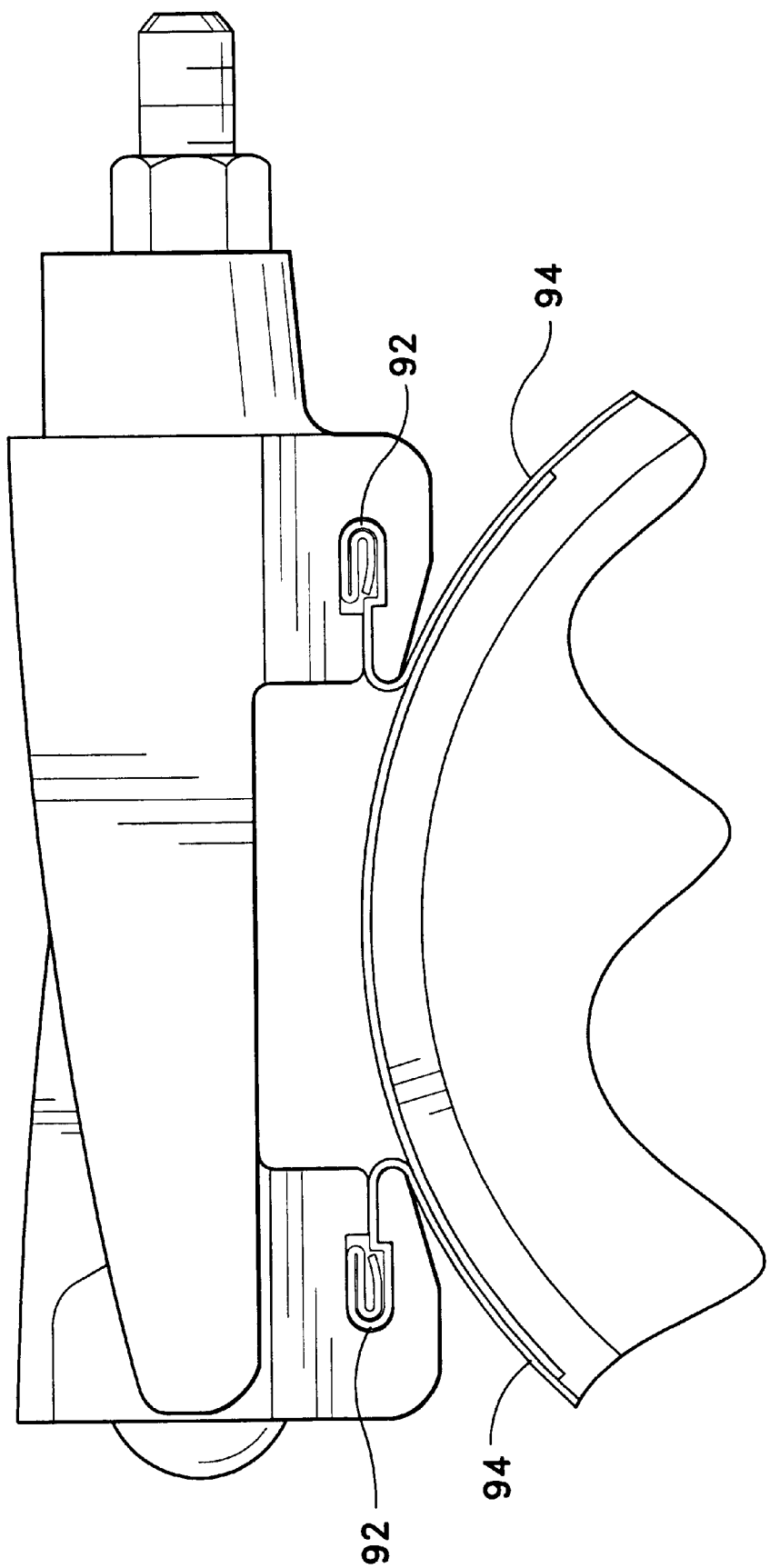
FIG. 7 is a side elevation view as in FIG. 2 having the metal band folded end inverted.
Figure 8:
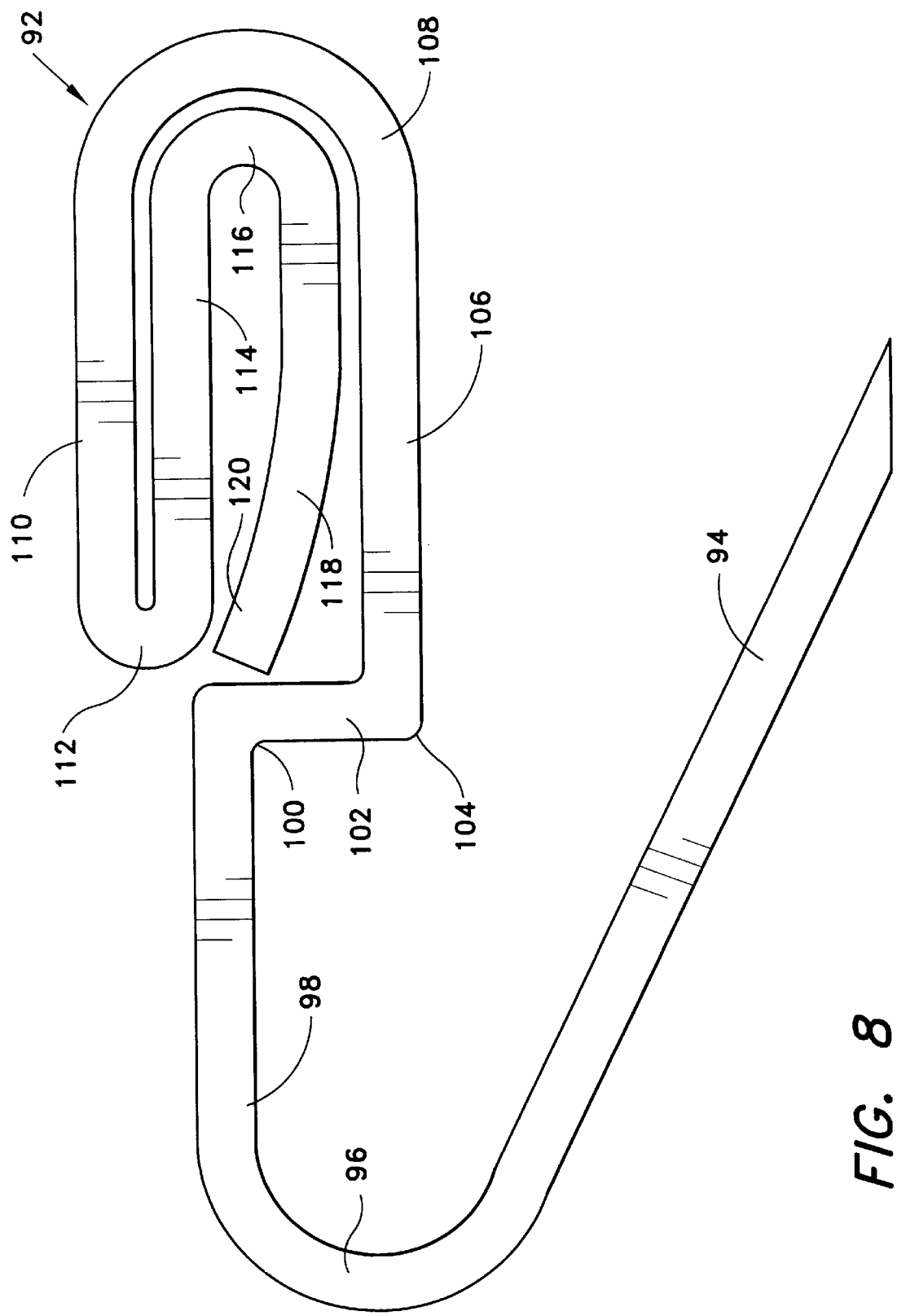
FIG. 8 is a detail view of the metal band folded end of FIG. 7.

Referring to FIG. 7 there is shown a side elevation view of another embodiment identical to that.of FIG. 2 with the exception that the band folds 92 of band 94 are inverted relative to the lug recesses 24 and 40.

Referring to FIG. 7, there is shown a detail view of the band folds of FIG. 7 wherein band 94 has inwardly coiled band end fold 92. Band 94 has an radius bend 96 leading to a horizontal portion 98 leading in turn to band end fold 92. Band end fold 92 has in succession a right angle upward bend 100, a vertical end portion 102, a right angle horizontal bend 104, a lower outer horizontal portion 106, a 180 degree radius bend 108, an upper outer horizontal portion 110, a 180 degree sharp radius bend 112, an inner upper horizontal portion 114, a 180 degree intermediate radius bend 116, an inner upward arc portion 118, and band end is portion 120. It may be appreciated that a tension force outward along horizontal portion 98 induces band end portion 120 to be urged forward and upward between right angle downward bend 100 and 180 degree sharp radius bend 112, thus locking the band end folds 92 in close lug recess 24 and open lug recess 40 (see FIG. 2).

In operation, gasket 52 is placed around pipe P and bridge plate 55 is placed over the leaking portion of pipe P. Repair clamp 12 is placed around pipe P such that close lug 14 and open lug 30 mutually overlap (see FIG. 3) such that close lug tensioner bar 16 bears on the upper surface of open lug body 34 and open lug tensioner bar 32 bears on the upper surface of close lug body 18. Bolt 46 is placed such that it rests in open lug receiving boss 42. The threaded end of bolt 46 is then pushed through close lug receiving boss 26 until bolt head 48 bears against open lug bolt head seat 44. Nut 50 is then screwed onto the threaded end of bolt 46 until snug against close lug nut bearing surface 28 while positioning repair clamp 12 over the center of bridge plate 55. Nut 50 is then tightened so as to draw open lug body 34 and close lug body 18 toward each other, thus pulling opposite ends of band 54,94 toward each other until band 54,94 is sufficiently tight around seal gasket 52 to assure sealing of the leak in pipe P.

Band end folds 56,92 are so configured relative to close lug groove 22 and recess 24 and open lug groove 38 and recess 40 as to lock into recesses 24 and 40 upon tension being applied to band 54,94 by tightening nut 50, thus assuring the integrity of the repair clamp.12. The design of the pressure jaws 20 and 36, each having a rounded open ends 23,39 leading to chamfers 25,41 along the lower surface of lug body jaw portions 19,35 provide for application of pressure normal to bridge plate 55 over a wide range of angles as determined by a range of pipe diameters thus avoiding crimping of the bridge plate 55. The chamfers 25,41 allow for lugs 14,30 to be separated a substantial distance as compared to previous designs, thus providing for a lower overall clamp profile, facilitating installation on pipes with limited clearance.

It is to be understood that the present invention is not limited to the embodiments described above, but encompasses any and all embodiments within the scope of the following claims.

I claim:

1. A pipe leak repair clamp assembly comprising:
   a close lug having an elongate body having an upper surface and lower surface;
   a tensioner bar extending upward and outward perpendicularly from said close lug body;
   an open lug having an elongate body having an upper surface and a lower surface;
   a tensioner bar extending upward and outward perpendicular from said open lug body;
   said close lug body having a boss thereon spaced from and parallel to said tensioner bar;
   said open lug body having a boss thereon spaced from and parallel to said tensioner bar;
   a bolt having a head end a threaded end;
   a nut adapted for screwing onto said threaded end;
   said close lug body boss having a nut bearing surface and being adapted to receive said bolt threaded end;
   said open lug body boss having an open lug bolt head seat and being adapted to receive said bolt head end;
   said close lug body and said open lug body being so arranged that said close lug tensioner bar bears on said open lug body on said upper surface thereof and said open lug tensioner bar bears on said close lug body on said upper surface thereof;
   each said close lug body and said open lug body having mutually facing jaw portions extending from the full length of said lug bodies;
   said jaw portions having a groove extending the length thereof defined by an upper jaw and a pressure jaw and opening into an inner recess also extending the length thereof;
   each said upper jaw and said pressure jaw having a common opening;
   each said pressure jaw having an arcuate end and a chamfer extending downward beneath said jaw portion to said lower surface thereof; and
   a flexible band having opposing folded ends and of such length to extend around a pipe to be repaired;
   said band opposing ends being so configured as to be secured within said inner recess and groove of said close lug jaw portion and said open lug jaw portion, respectively;
   whereby upon assembly of said repair clamp assembly, said band is tightened around said pipe upon tightening said nut against said nut bearing surface;
   wherein each said end band opposing folded ends has inwardly spiraled multiple folds, comprising a radius bend, a horizontal portion, a right angle upward bend, a vertical end portion, a right angle horizontal bend, an upper outer horizontal portion, a 180 degree radius bend, a lower outer horizontal portion, a 180 degree sharp radius bend, an inner lower horizontal portion, a 180 degree medium radius bend, and an inner downward arc portion leading to a band end portion located between said 180 degree sharp radius bend and said vertical end portion in the vicinity of said right angle upward bend such that upon tension being placed on said band, said band end portion locks between said 180 degree sharp radius bend and said right angle upward bend; and
   wherein said recess has an outer upper wall and an outer lower wall extending from said groove opening, an inner concave wall opposite said outer walls, an upper wall extending between said outer upper wall and said inner concave wall, and a lower wall extending between said outer lower wall and said inner concave wall.

2. The pipe leak repair clamp assembly of claim 1, further comprising a gasket extending around said pipe located between said pipe and said band of said repair clamp.

3. The pipe leak repair clamp assembly of claim 2, further comprising a bridge plate conforming with said gasket, located between said repair clamp and said gasket and extending between and beyond said lugs when separated their maximum distance.

4. The pipe leak repair clamp assembly of claim 1, wherein said recess outer lower wall is spaced inward from said recess outer upper wall by about the thickness of said band.

5. The pipe leak repair clamp assembly of claim 4, wherein said vertical upward bend, said vertical end portion, said right angle horizontal bend, said upper outer horizontal portion, said 180 degree radius bend, said lower outer horizontal portion, and said 180 degree sharp radius bend conform with said recess outer upper wall, said upper wall, said concave inner wall, said lower wall, and said outer lower wall, respectively.

6. A pipe leak repair clamp assembly comprising:
a close lug having an elongate body having an upper surface and lower surface;
a tensioner bar extending upward and outward perpendicularly from said close lug body;
an open lug having an elongate body having an upper surface and a lower surface;
a tensioner bar extending upward and outward perpendicular from said open lug body;
said close lug body having a boss thereon spaced from and parallel to said tensioner bar;
said open lug body having a boss thereon spaced from and parallel to said tensioner bar;
a bolt having a head end a threaded end;
a nut adapted for screwing onto said threaded end;
said close lug body boss having a nut bearing surface and being adapted to receive said bolt threaded end;
said open lug body boss having an open lug bolt head seat and being adapted to receive said bolt head end;
said close lug body and said open lug body being so arranged that said close lug tensioner bar bears on said open lug body on said upper surface thereof and said open lug tensioner bar bears on said close lug body on said upper surface thereof;
each said close lug body and said open lug body having mutually facing jaw portions extending from the full length of said lug bodies;
said jaw portions having a groove extending the length thereof defined by an upper jaw and a pressure jaw and opening into an inner recess also extending the length thereof;
each said upper jaw and said pressure jaw having a common opening;
each said pressure jaw having an arcuate end and a chamfer extending downward beneath said jaw portion to said lower surface thereof; and
a flexible band having opposing folded ends and of such length to extend around a pipe to be repaired;
said band opposing ends being so configured as to be secured within said inner recess and groove of said close lug jaw portion and said open lug jaw portion, respectively;
whereby upon assembly of said repair clamp assembly, said band is tightened around said pipe upon tightening said nut against said nut bearing surface;
wherein each said end band opposing folded ends has inwardly spiraled multiple folds;
wherein said recess has an outer upper wall and an outer lower wall extending from said groove opening, an inner concave wall opposite said outer walls, an upper wall extending between said outer upper wall and said inner concave wall, and a lower wall extending between said outer lower wall and said inner concave wall;
wherein said inwardly spiraled multiple folds are inverted and comprise a right angle downward bend, a vertical end portion, a right angle horizontal bend, a lower outer horizontal portion, a 180 degree radius bend, an upper outer horizontal portion, a 180 degree sharp radius bend, an inner upper horizontal portion, a 180 degree sharp radius bend, an inner upward arc portion leading to a band end portion located between said 180 degree medium radius bend and said vertical end portion in the vicinity of said right angle downward bend such that upon tension being placed on said band, said band end portion locks between said 180 degree sharp radius bend and said right angle downward bend.

7. A pipe leak repair clamp assembly comprising:
a close lug having an elongate body having an upper surface and lower surface;
a tensioner bar extending upward and outward perpendicularly from said close lug body;
an open lug having an elongate body having an upper surface and a lower surface;
a tensioner bar extending upward and outward perpendicular from said open lug body;
said close lug body having a boss thereon spaced from and parallel to said tensioner bar;
said open lug body having a boss thereon spaced from and parallel to said tensioner bar;
a bolt having a head end a threaded end;
a nut adapted for screwing onto said threaded end;
said close lug body boss having a nut bearing surface and being adapted to receive said bolt threaded end;
said open lug body boss having an open lug bolt head seat and being adapted to receive said bolt head end;
said close lug body and said open lug body being so arranged that said close lug tensioner bar rests on said open lug body on said upper surface thereof and said open lug tensioner bar rests on said close lug body on said upper surface thereof;
each said close lug body and said open lug body having mutually facing jaw portions extending from the full length of said lug bodies;
said jaw portions having a groove extending the length thereof defined by an upper jaw and a pressure jaw and opening into an inner recess;
each said upper jaw and said pressure jaw having a common opening; and
an elastic band having opposing folded ends and of such length as to extend around a pipe to be repaired;
said opposing folded ends having inwardly spiraled multiple folds, said folds comprising a radius bend, a horizontal portion, a right angle upward bend, a vertical end portion, a right angle horizontal bend, an upper outer horizontal portion, a 180 degree radius bend, a lower outer horizontal portion, a 180 degree sharp radius bend, an inner lower horizontal portion, a 180 degree medium radius bend, and an inner downward arc portion leading to a band end portion located between said 180 degree sharp radius bend and said vertical end portion in the vicinity of said right angle upward bend such that upon tension being placed on said band, said band end portion locks between said 180 degree sharp radius bend and said right angle upward bend;
said strap opposing ends being so configured as to be secured within said inner recess and groove of said close lug jaw portion and said open lug jaw portion, respectively;
whereby upon assembly of said repair clamp assembly, said band is tightened around said pipe upon tightening said nut against said nut bearing surface.

8. The pipe leak repair clamp assembly of claim 7, further comprising a gasket extending around said pipe located between said pipe and said flexible band of said repair clamp and a bridge plate conforming with said gasket, located between said repair clamp and said gasket and extending between and beyond said lugs when separated their maximum distance.

9. The pipe leak repair clamp assembly of claim 7, wherein said recess has an outer upper wall and an outer lower wall extending from said groove opening, an inner concave wall opposite said outer walls, an upper wall extending between said outer upper wall and said inner concave wall, and a lower wall extending between said outer lower wall and said inner concave wall.

10. The pipe leak repair clamp assembly of claim 9, wherein said vertical upward bend, said vertical end portion, said right angle horizontal bend, said upper outer horizontal portion, said 180 degree radius bend, said lower outer horizontal portion, and said 180 degree sharp radius bend conform with said recess outer upper wall, said upper wall, said concave inner wall, said lower wall, and said outer lower wall, respectively.

11. The pipe leak repair clamp assembly of claim 10, each said pressure jaw having an arcuate end and a chamfer extending downward beneath said jaw portion to said lower surface thereof.

12. A pipe leak repair clamp assembly comprising:
   a close lug having an elongate body having an upper surface and lower surface;
   a tensioner bar extending upward and outward perpendicularly from said close lug body;
   an open lug having an elongate body having an upper surface and a lower surface;
   a tensioner bar extending upward and outward perpendicular from said open lug body;
   said close lug body having a boss thereon spaced from and parallel to said tensioner bar;
   said open lug body having a boss thereon spaced from and parallel to said tensioner bar;
   a bolt having a head end a threaded end;
   a nut adapted for screwing onto said threaded end;
   said close lug body boss having a nut bearing surface and being adapted to receive said bolt threaded end;
   said open lug body boss having an open lug bolt head seat and being adapted to receive said bolt head end;
   said close lug body and said open lug body being so arranged that said close lug tensioner bar rests on said open lug body on said upper surface thereof and said open lug tensioner bar rests on said close lug body on said upper surface thereof;
   each said close lug body and said open lug body having mutually facing jaw portions extending from the full length of said lug bodies;
   said jaw portions having a groove extending the length thereof defined by an upper jaw and a pressure jaw and opening into an inner recess;
   each said upper jaw and said pressure jaw having a common opening; and
   an elastic band having opposing folded ends and of such length as to extend around a pipe to be repaired;
   said opposing folded ends having inwardly spiraled multiple folds;
   wherein said inwardly spiraled multiple folds are reversed and comprise a right angle downward bend, a vertical end portion, a right angle horizontal bend, a lower outer horizontal portion, a 180 degree radius bend, an upper outer horizontal portion, a 180 degree sharp radius bend, an inner upper horizontal portion, a 180 degree medium radius bend, an inner upward arc portion leading to a band end portion located between said 180 degree sharp radius bend and said vertical end portion in the vicinity of said right angle downward bend such that upon tension being placed on said band, said band end portion locks between said 180 degree sharp radius bend and said right angle downward bend;
   said strap opposing ends being so configured as to be secured within said inner recess and groove of said close lug jaw portion and said open lug jaw portion, respectively;
   whereby upon assembly of said repair clamp assembly, said band is tightened around said pipe upon tightening said nut against said nut bearing surface.

\* \* \* \* \*